(12) United States Patent
Franceschetti et al.

(10) Patent No.: US 12,524,393 B1
(45) Date of Patent: Jan. 13, 2026

(54) SYSTEMS AND METHODS FOR GROUPING DATA AND DETERMINING ANOMALIES WITHIN DATA

(71) Applicant: Optum Services (Ireland) Limited, Dublin (IE)

(72) Inventors: Michela Franceschetti, Dublin (IE); Richard Mcaleavey, Balscadden (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 18/767,109

(22) Filed: Jul. 9, 2024

(51) Int. Cl.
*G06F 16/00* (2019.01)
*G06F 16/23* (2019.01)
*G06F 16/28* (2019.01)

(52) U.S. Cl.
CPC ........ *G06F 16/2365* (2019.01); *G06F 16/285* (2019.01)

(58) Field of Classification Search
CPC ......... G06F 16/24573; G06F 16/24578; G06F 16/248; G06F 16/285; G06F 16/953; G06F 16/9535; G06F 3/04847; G06F 15/76; G06F 15/7825; G06F 8/314; G06F 8/33; G06F 8/41; G06F 8/427; G06F 8/443; G06F 8/4434; G06F 8/445; G06F 8/447; G06F 8/451; G06F 8/70; G06F 9/30145; G06F 16/1744; G06F 16/221; G06F 16/27; G06F 16/278; G06F 16/21; G06F 11/0709; G06F 11/079; G06F 11/2094; G06F 11/3419; G06F 11/3495; G06F 2201/87; G06F 9/06; G16H 50/20; G16H 15/00; G16H 10/60; G16H 30/20; G16H 30/40; G16H 40/60; G16H 50/50; G16H 50/70

See application file for complete search history.

(56) References Cited

U.S. PATENT DOCUMENTS

| | | | |
|---|---|---|---|
| 7,685,006 B2 | 3/2010 | Rahn et al. | |
| 8,762,180 B2 | 6/2014 | Ghani et al. | |
| 2009/0177692 A1* | 7/2009 | Chagoly | G06F 11/3495 |
| 2017/0323382 A1 | 11/2017 | Ohlsson | |
| 2018/0357289 A1* | 12/2018 | Wittke | G06F 16/24573 |

* cited by examiner

*Primary Examiner* — Shyue Jiunn Hwa
(74) *Attorney, Agent, or Firm* — Bookoff McAndrews, PLLC

(57) ABSTRACT

A computer-implemented method of accessing, by one or more processors, database tables that include a first row storing a first set of data that includes selection criteria values and first data values and a second row storing a second set of data that includes the selection criteria values and second data values. After determining the first and second sets of data share the selection criteria, the method groups the first and second row to generate a grouped row that indicates a comparison of data based on certain data formats. The method iteratively performs the grouping across the database tables to generate a plurality of grouped rows which are incremented by a counter value to reflect the total number of grouped rows. The method generates a performance metric based on the counter value incremented.

20 Claims, 8 Drawing Sheets

| | 300 | | | 326 | |
|---|---|---|---|---|---|
| | 302 | 304 | | 302 | 304 |
| 306 | User Identifier | Resource Request 310 | | User Identifier | Resource Request |
| 308 | E | 5 | 328 | A | 2 |
| | C | 2 | | A | 4 |
| | E | 1 | | A | 3 |
| | C | 3 | | A | 1 |
| | E | 2 | 330 | B | 2 |
| | D | 2 | | B | 1 |
| | B | 1 | 332 | C | 3 |
| | E | 6 | | C | 2 |
| | D | 1 | | C | 5 |
| | A | 1 | | C | 4 |
| | C | 1 | | C | 1 |
| | A | 2 | 334 | D | 2 |
| | A | 3 | | D | 1 |
| | B | 2 | 336 | E | 5 |
| | A | 4 | | E | 4 |
| | C | 5 | | E | 2 |
| | E | 3 | | E | 6 |
| | E | 4 | | E | 3 |
| | C | 4 | | E | 1 |

| User Identifier | Resource Request | Prediction Indicator | Confidence Level | Amount of ERA | Expected Value |
|---|---|---|---|---|---|
| A | 2 | | | | |
| A | 4 | CONFIRMED | 0.92 | 1800 | 1656 |
| A | 3 | | | | |
| A | 1 | | | | |
| B | 2 | REJECTED | 0.15 | 1300 | 195 |
| B | 1 | | | | |
| C | 3 | | | | |
| C | 2 | CONFIRMED | 0.51 | 700 | 357 |
| C | 5 | | | | |
| C | 4 | CONFIMRED | 0.73 | 200 | 156 |
| C | 1 | | | | |
| D | 2 | | | | |
| D | 1 | CONFIRMED | 0.81 | 1000 | 810 |
| E | 5 | REJECTED | 0.43 | 2000 | 860 |
| E | 4 | | | | |
| E | 2 | CONFIMRED | 0.62 | 500 | 310 |
| E | 6 | | | | |
| E | 3 | CONFIMRED | 0.57 | 300 | 171 |
| E | 1 | | | | |

Reference Data Entry
Target Data Entry

| Group | User Identifier | Resource Request(s) | Group Score | Group EV |
|---|---|---|---|---|
| 328 | A | [2, 4, 3, 1] | 0.92 | 1656 |
| 330 | B | [2, 1] | 0.15 | 195 |
| 332 | C | [3, 2, 5, 4, 1] | 0.87 | 503 |
| 334 | D | [2, 1] | 0.81 | 810 |
| 336 | E | [5, 4, 2, 6, 3, 1] | 0.91 | 1341 |

| Group 380 | User Identifier 302 | Resource Request(s) 382 | Group Score 384 | Group EV 386 |
|---|---|---|---|---|
| 236 | E | [5, 4, 2, 6, 3, 1] | 0.93 | 1341 |
| 228 | A | [2, 4, 3, 1] | 0.92 | 1656 |
| 232 | C | [3, 2, 5, 4, 1] | 0.87 | 503 |
| 234 | D | [2, 1] | 0.81 | 810 |
| 230 | B | [2, 1] | 0.15 | 195 |

| Group 380 | User Identifier 302 | Resource Request(s) 382 | Group Score 384 | Group EV 386 |
|---|---|---|---|---|
| 228 | A | [2, 4, 3, 1] | 0.92 | 1656 |
| 236 | E | [5, 4, 2, 6, 3, 1] | 0.93 | 1341 |
| 234 | D | [2, 1] | 0.81 | 810 |
| 232 | C | [3, 2, 5, 4, 1] | 0.87 | 503 |
| 230 | B | [2, 1] | 0.15 | 195 |

FIG. 4B

SYSTEMS AND METHODS FOR GROUPING DATA AND DETERMINING ANOMALIES WITHIN DATA

TECHNICAL FIELD

This present disclosure relates generally to the field of data processing and predictive analytics. In particular, the present disclosure relates to grouping data, determining anomalies within the data, and determining performance metrics from the data.

BACKGROUND

Conventional methods for detecting a possible anomaly (e.g., outlier value, unexpected value, etc.) of a data entry often require a reviewer of the data to manually group, compare, and cross-reference the data entry with the anomaly. Conventional methods are unable to accurately detect anomalies within a set of data entries as they are susceptible to human error, they are not standardized, and the quantity of data entries can be overwhelming for a reviewer. In other words, conventional methods fail to accurately predict and/or detect anomalies within a set of data entries as they fail to comprehensively analyze various relevant other data entries associated with a certain data entry. This raises concerns about result accuracy and produces a high incidence of false positives and false negatives. Moreover, due to the format of the data provided, it can be challenging for a reviewer to provide accurate performance metrics based on the data values.

Due to the variability of values and information across a plurality of data entries, it is challenging to develop a standardized technique for detecting a data entry with an anomaly within a set of data entries. Furthermore, the reliance on reviewers to manually identify anomalies in large, unorganized data sets introduces even more variance that complicates standardizing the data analysis process. The large number of data entries requiring review additionally causes the process to be slow, cumbersome, and error prone.

SUMMARY OF THE DISCLOSURE

The present disclosure solves the technical challenges typically encountered during the use of a conventional method, such as those discussed above. Specifically, the present disclosure solves the technical challenges by providing a centralized system that groups data entries, predicts and/or detects data entries with potential anomalies within a set of data entries, and generates a performance metric (e.g., flag) based on the groups of data with or without using machine learning models.

In some aspects, the techniques described herein relate to a computer-implemented method including: accessing, by one or more processors, one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, grouping, by one or more processors, the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively performing, by the one or more processors, the grouping across the one or more database tables to generate a plurality of grouped rows; incrementing, by the one or more processors, a counter value to reflect a total number of the plurality of grouped rows; and generating, by the one or more processors, a performance metric based on the counter value.

In some aspects, the techniques described herein relate to a method, further including: determining, by the one or more processors, whether the one or more first data values are common to the first row and to the second row; and determining, by the one or more processors, whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

In some aspects, the techniques described herein relate to a method, further including: causing, by the one or more processors, display of a graphical element based on the first data format, the graphical element corresponding to the data field and indicating that the one or more first data values are common to the first row and to the second row and that the one or more second data values are common to the first row and to the second row.

In some aspects, the techniques described herein relate to a method, further including: determining, by the one or more processors, whether the one or more first data values are common to the first row and to the second row; and determining, by the one or more processors, whether the one or more second data values are common to the first row and to the second row, wherein, in response to determining that the one or more first data values are not common to the first row and to the second row and that the one or more second data values are not common to the first row and to the second row, the determined data format is a second data format that represents an absence of commonality.

In some aspects, the techniques described herein relate to a method, further including: causing, by the one or more processors, display of a graphical element based on the second data format, the graphical element corresponding to the data field indicating that the one or more first data values are not common to the first row and to the second row and that the one or more second data values are not common to the first row and to the second row.

In some aspects, the techniques described herein relate to a method, wherein the data field is a binary flag value.

In some aspects, the techniques described herein relate to a method, further including: applying, by the one or more processors, a machine-learning model to content of the grouped row, the machine-learning model having been trained to identify data entries in the grouped row as a reference data entry or as a target data entry; and determining, by the one or more processors and based on the application of the machine-learning model to the grouped row, a prediction indicator indicating whether the target data entry is a confirmed target data entry or a rejected target data entry.

In some aspects, the techniques described herein relate to a method, further including: determining, by the one or more processors and based on the application of the machine-learning model to the grouped row, a confidence level for each prediction indicator, the confidence level being indicative of a probability that the target data entry is a correctly identified confirmed target data entry.

In some aspects, the techniques described herein relate to a method, the method further including: determining, by the one or more processors, based on the application of the machine-learning model to the plurality of grouped rows, a group score for each grouped row, the group score being indicative of a probability that the corresponding grouped row includes at least one confirmed data entry by aggregating the confidence level for each target data entry within the corresponding grouped row.

In some aspects, the techniques described herein relate to a system including: one or more processors of a computing system; and at least one non-transitory computer readable medium storing instructions which, when executed by the one or more processors, cause the one or more processors to: access one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, group the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively perform the grouping across the one or more database tables to generate a plurality of grouped rows; increment a counter value to reflect a total number of the plurality of grouped rows; and generate a performance metric based on the counter value.

In some aspects, the techniques described herein relate to a system, wherein the instructions, when executed by the one or more processors, cause the one or more processors to: determine whether the one or more first data values are common to the first row and to the second row; and determine whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

In some aspects, the techniques described herein relate to a system, wherein the instructions, when executed by the one or more processors, further cause the one or more processors to: cause display of a graphical element based on the first data format, the graphical element corresponding to the data field and indicating that the one or more first data values are common to the first row and to the second row and that the one or more second data values are common to the first row and to the second row.

In some aspects, the techniques described herein relate to a system, wherein the instructions, when executed by the one or more processors, further cause the one or more processors to: determine whether the one or more first data values are common to the first row and to the second row; and determine whether the one or more second data values are common to the first row and to the second row, wherein, in response to determining that the one or more first data values are not common to the first row and to the second row and that the one or more second data values are not common to the first row and to the second row, the determined data format is a second data format that represents an absence of commonality.

In some aspects, the techniques described herein relate to a system, wherein the instructions, when executed by the one or more processors, further cause the one or more processors to: cause display of a graphical element based on the second data format, the graphical element corresponding to the data field indicating that the one or more first data values are not common to the first row and to the second row and that the one or more second data values are not common to the first row and to the second row.

In some aspects, the techniques described herein relate to a system, wherein the data field is a binary flag value.

In some aspects, the techniques described herein relate to a system, wherein the instructions, when executed by the one or more processors, further cause the one or more processors to: apply a machine-learning model to content of the grouped row, the machine-learning model having been trained to identify data entries in the grouped row as a reference data entry or as a target data; and determine, based on the application of the machine-learning model to the grouped row, a prediction indicator indicating whether the target data entry is a confirmed target data entry or a rejected target data entry.

In some aspects, the techniques described herein relate to a system, wherein the instructions, when executed by the one or more processors, further cause the one or more processors to: determine, based on the application of the machine-learning model to the grouped row, a confidence level for each prediction indicator, the confidence level being indicative of a probability that the target data entry is a correctly identified confirmed target data entry.

In some aspects, the techniques described herein relate to a system, wherein the instructions, when executed by the one or more processors, further cause the one or more processors to: determine, based on the application of the machine-learning model to the plurality of grouped rows, a group score for each grouped row, the group score being indicative of a probability that the corresponding grouped row includes at least one confirmed data entry by aggregating the confidence level for each target data entry within the corresponding grouped row.

In some aspects, the techniques described herein relate to a non-transitory computer readable medium, the non-transitory computer readable medium storing instructions which, when executed by one or more processors of a computing system, cause the one or more processors to: access one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, group the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively perform the grouping across the one or more database tables to generate a plurality of grouped rows; increment a counter value to reflect a total number of the plurality of grouped rows; and generate a performance metric based on the counter value.

In some aspects, the techniques described herein relate to a non-transitory computer readable medium, wherein the instructions, when executed by the one or more processors, further cause the one or more processors to: determine whether the one or more first data values are common to the first row and to the second row; and determine whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIGS. 3A-3D are diagrams that illustrate a process for identifying and predicting an anomaly in data entries using an optional machine learning model, according to aspects of the disclosure.

FIGS. 4A-4B are tables that illustrate a sorting process using the exemplary values of FIGS. 3A-3D, according to aspects of the present disclosure.

DETAILED DESCRIPTION OF EMBODIMENTS

Figure 1:
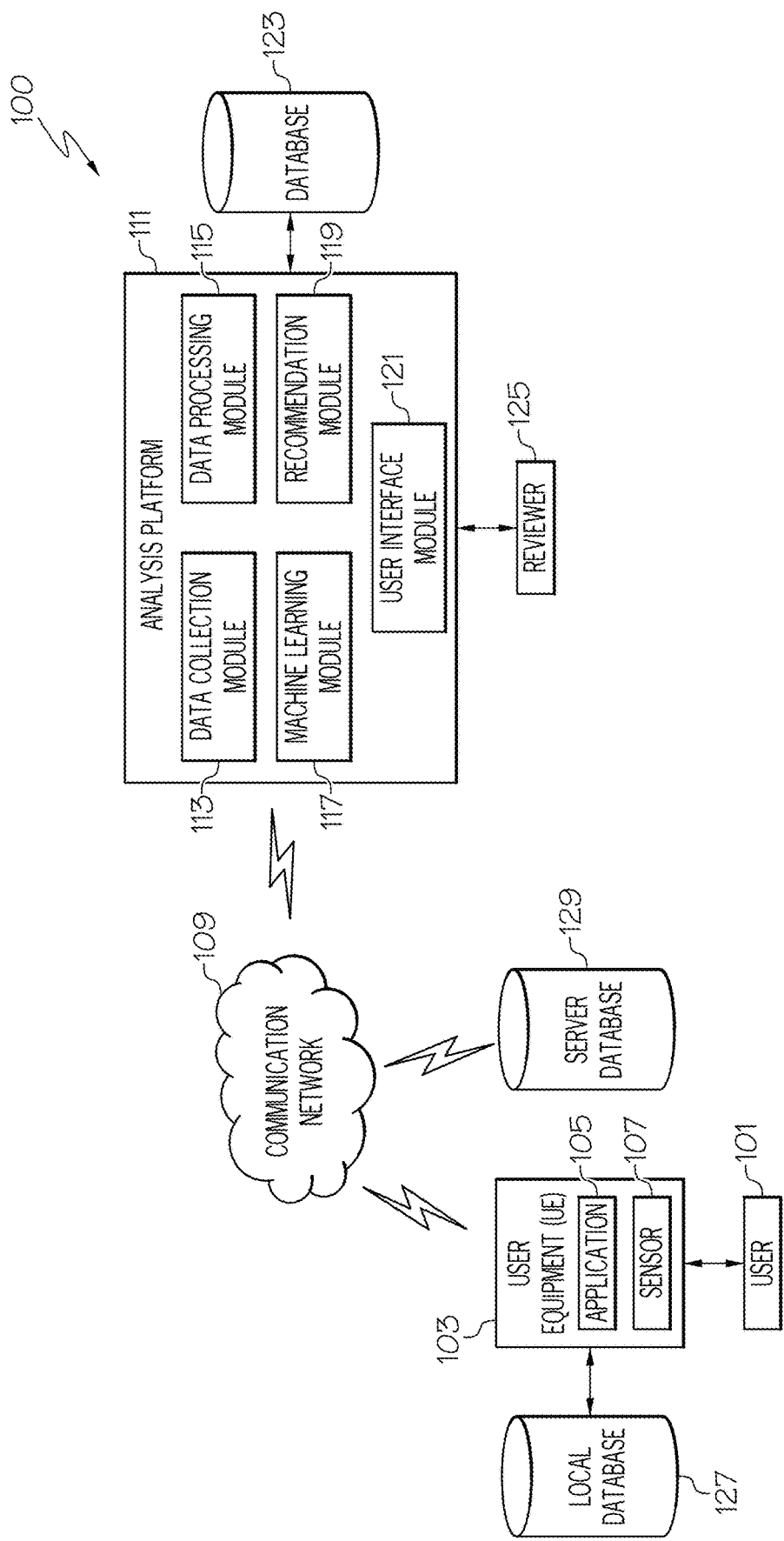
FIG. 1 is a diagram showing an example of a system for grouping, identifying and predicting an anomaly in data entries, and generating performance metrics using an optional machine learning model, according to aspects of the disclosure.

This present disclosure relates generally to the field of data processing and predictive analytics. In particular, the present disclosure relates to analyzing and grouping data entries to determine and predict data entries for auditing and to determine performance metrics of the groups, with or without machine learning.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for grouping data entries, predicting and/or detecting anomalies within data entries, and providing data flags (e.g., performance metrics) based on the data and/or the groups of data. Anomalies may be considered statistical outliers, or, in general, data values that are unexpected. Moreover, anomalies may be detected and/or validated by comparing related data values from different data entries.

Conventional methods are unable to effectively group, cross-reference, and otherwise compare objects in a data set to identify or validate the presence of an anomaly within the data set. A reviewer may manually process hundreds, if not thousands, of unorganized data objects in a data set to find and validate accuracy of the information present in the data set. For example, a reviewer may receive a data set where a small minority of the data entries have been flagged as potential target data entries with an anomaly while a large majority of the data entries are included solely as reference data entries to validate the potential anomalies. It is unproductive and counter-intuitive for the reviewer to analyze each data entry as most of the data entries have already been deemed accurate and are included to assist in determining an anomaly in a different data entry. Moreover, the vast amount of data entries can be visually overwhelming for the reviewer, increasing the chance of an error due to fatigue.

In an example, conventional methods may be related to the field of insurance, where the reviewer may be an auditor, the data entry may be an insurance claim, and the anomaly may be an overpayment. In an example, conventional methods may be related to the field of data analytics, where the reviewer may be a statistical analyzer, the data entry may be statistical data, and the anomaly may be a statistical outlier.

Often, in conventional methods, each data entry is given a flag to indicate if the review found an anomaly within that data entry or if the data entry had correct data (e.g., the data entry is rejected for further reviewing). However, the reference data entries that are included in a group of data entries are also given the same flag identification. Since the reference data entries are provided to validate the presence of an anomaly for the target claims (e.g., the data entries that have been flagged as potentially having an anomaly), the reference data entries should always be flagged as rejected. When reviewing the group of data entries that have been flagged as either having an anomaly or rejected, the large number of reference data entries flagged as rejected can be misleading and can create incorrect conclusions and/or assumptions regarding the data set. For example, the reference data entries can cause visual clutter that makes it challenging to accurately identify the data entries that include an anomaly.

Accordingly, these and other conventional methods have several drawbacks. Because most overpayment scenarios require consideration of information across multiple data entries (e.g., the reference data entries described above), the inventory of data entries provided to a reviewer can quickly become cluttered with reference data entries. The target data entries and the reference data entries are provided unsorted to the reviewer, which causes additional issues. The reviewer must verify the overpayment (e.g., anomaly) using any and all reference data entries related to the target data entry, but, since the target data entries and reference data entries are not sorted, the reviewer must review each data entry provided in the inventory to cross-reference the target data entry. Conventional methods, for these and other reasons, fail to provide a standardized way to review and audit data entries. This creates additional challenges with reviewing audits provided by different reviewers, as each reviewer may perform the audit (e.g., the review process) differently. Thus, conventional methods are limited in its ability to detect an anomaly of a data entry, as well as to provide accurate and reliable predictions.

The present disclosure provides embodiments that address the above shortcomings in the field of data processing and predictive analytics, leading to significant technical improvements in the same field. For instance, system 100 discussed in the present disclosure overcomes the technical shortcomings of conventional techniques by dynamically collecting and integrating a wide variety of relevant data sets associated with the target data entries from a plurality of data sources, and comprehensively analyzing the relevant data sets to yield high accuracy and low incidence of false positives and/or false negatives in predicting a possible anomaly associated with a target data entry within the data sets analyzed. In general, the system 100 is capable of intelligently grouping data entries with a shared selection criteria value, determining and predicting data entries with anomalies, and providing flag values (e.g., performance metrics) based on the data entries and groups of data entries. The system 100 is capable of performing these functions with or without the use of a machine learning program, such as machine learning module 117.

Advantageously, the system 100 implements a technique that allows for quick and automated grouping of the data entries such that each data entry is grouped with corresponding relevant (e.g., reference) data entries for that data entry. Moreover, the system 100 implements a technique that allows for accurate detection of a target data entry with an anomaly by taking into consideration the reference data entries associated with the target data entry. To that end, the system 100 introduces an exhaustive, effective, and sophisticated process for collecting a wide range of relevant data from various data sources, and optionally utilizes a machine learning model configured to generate scores or indicators for each entity, where the scores or indicators represent predictions with varying confidence levels for determining target data entries with anomalies.

The system 100 includes numerous technical improvements over conventional systems. For example, the system 100 substantially reduces the complexity of database tables provided to a reviewer and/or program. Rows of sets of data are adaptively grouped by similar data present in the sets. It is unconventional for the data to be pre-organized in a way that increases the efficiency of the review process of the data. The system 100 achieves this, for example, by generating new rows based on the rows that have been deemed similar (e.g., rows that have the same selection criteria) and providing the new rows with specific data formats. These data formats, as described herein, can indicate valuable information, such as similar column values, different column values, or if columns had no data values in certain rows grouped into the new row. The system 100 thus provides data in an unconventional arrangement, allowing for faster review, easier data analysis (e.g., from the data format that compares data values form separate rows), and more accurate performance metrics.

In one embodiment, the system 100 accesses one or more database tables (e.g., a local database, a server database, etc.) that include at least a first and a second row storing a first set of data and a second set of data (e.g., a reference data set, a target data set, a current data set, etc.), each set of data including one or more first selection criteria values and unique data values. For example, the first set of data includes a selection criteria and one or more data values while the second set of data includes the same selection criteria (e.g., the second set of data is related to the first set based on the selection criteria selected by the system 100) and data values that are different than the data values found in the first set of data. The data entries include data related to one or more categories. That is, a data value from one set of data is related to the same or different category as different data values from the same set of data. Moreover, the selection criteria is based on the data value for a specific category or for a combination of categories.

For example, the data entries may be insurance claims that include data related to a member or subscriber number (e.g., a unique user identifier), a provider, a diagnosis, a modifier, a treatment plan, a prescription frequency and/or history, etc. The data entries may be statistical data for numerous subjects. For example, if the data is related to statistical weather data, the data included may be related to cloud coverage, dew point, daily temperature range, wind speed, etc. If the data is related to statistical baseball data, the data included may be related to batting average, strikeouts, home runs, sprint speed, on base average, etc. The system 100 may then access a chosen selection criteria.

The selection criteria is related to one or more categories associated with the data entries. The selection criteria may provide a "rule" for the system 100. For example, the selection criteria may be a unique identifier, such as a member or subscriber number, or it may be a combination of a provider and a diagnosis. In some aspects, the rule is the frequency of prescription medicine or duplicate physicians. The system 100 uses the accessed selection criteria to generate one or more groups (e.g., bundles) of data entries. The first row with the first set of data and the second row with the second set of data are typically ungrouped and unorganized; therefore, the selection criteria is utilized to intelligently group the rows of data. In this way, after determining the first set of data and second set of data share the same selection criteria, the system 100 groups the first row and the second row to generate a third row (e.g., a grouped row). This newly-generated third row presents first data values and second data values in a data format that is determined based on comparing the first data values and the second data values. Additionally, the grouped row provides a data field that includes an indication (e.g., a high-level flag separate to the performance metric) of the comparison. For example, the indication includes a binary value (e.g., a value that represents "yes" or "no") indicating whether data values related to one or more categories from the first row are the same as the second row. The third row forms a group or bundle of the first and second rows and presents data in a format that is different from that of the first row and that of the second row. The system 100 iteratively performs the grouping process across the database tables provided such that the entirety (or at least a portion) of the provided rows of sets of data are bundled, or grouped, into new rows as described herein.

The system 100 groups the data entries such that each data entry within a group includes the same selection criteria. For example, each bundle includes all data entries that are associated with a certain member or subscriber number, or each bundle includes all data entries associated with a certain provider and a certain diagnosis. The system 100, in some embodiments, applies a machine learning model to analyze the generated bundles. However, in some examples, a machine learning model is not included, reducing computational load.

While the system 100 groups the rows of data from the database table(s) into newly generated bundled rows, the system 100 increments a counter value to reflect the total number of newly generated rows. For example, this counter values is indicative of the amount of newly generated bundles (e.g., a row including data from more than one provided rows of data as described above) and can be displayed with each bundle generated (e.g., each bundle may have a "counter" data value that displays "GROUP_1", "BUNDLE_1", or some other alphanumerical value to indicate which bundle it is). As will be further described below, instead of the system 100 generating performance data (e.g., various data parameters associated with one or more categories of data to be used to analyze the data) based on the provided rows, the system 100 can generate one or more performance metrics based on the newly generated rows (e.g., bundles). Thus, the performance data will be more accurate as the bundles may remove duplicate data or data that erroneously impacts the metric being analyzed (e.g., three out of ten provided data rows may have a certain characteristic, but only one out of four bundles may have that same characteristic, changing the metric from an erroneous 30% to a correct 25%).

The machine learning model of system 100 may be trained or have been trained to identify if a data entry is either a target data entry or a reference data entry. In some aspects, the system 100 does not include a machine learning model and instead utilizes data analytic techniques, such as cohort analyses, cluster analyses, etc., to identify data. That is, the system 100 creates bundles of related data entries based on the selection criteria such that the analytic techniques and/or machine learning model identify which data entries are target data entries (and, thus, may be further analyzed to find an anomaly) and which data entries are reference data entries (and, thus, may not be further analyzed to find an anomaly). In examples, the reference data entries are solely used to validate the presence of an anomaly in a target data entry. Because of this, further analysis of a large portion of the data entries (e.g., the reference data entries) is not be needed once the system identifies which data entries are reference data entries.

Once the system 100 is configured to identify the target data entries, the system 100 cross-references the target data entries with the reference data entries to determine if the target data entry includes an anomaly or if the target data entry does not include an anomaly. More specifically, the system 100 compares target data entries within one bundle with reference data entries within the same bundle to validate the presence of an anomaly. The system 100 is then able to identify a target data entry as either a confirmed target data entry (e.g., a target data entry with an anomaly) or a rejected target data entry (e.g., a target data entry without an anomaly) via the machine learning model. A reviewer may then analyze the data set by using the groups (or bundles) instead of individual data entries. Individual data entries can provide misleading metrics. When comparing potential anomalies within each data entry, reference data entries may be erroneously included. Using groups ensures normalized metrics that accurately reflect conclusions that can be made from the data provided. For example, there may be a total of 1000 data entries, 250 of which include anomalies. It may appear 25% of the data entries have an anomaly. However, after grouping the data entries to include reference data entries with their respective target data entries, there are 500 groups, 250 of which include anomalies. Thus, for this exemplary data set, 50% of the groups have an anomaly which more accurately reflects the true amount of erroneous data entries within the data set (since reference data entries should not be analyzed).

The system 100 is configured to determine, based on the application of analytic techniques and/or the machine learning model, a prediction indicator for each data entry. The prediction indicator is a flag or any other type of indicator known in the art. Specifically, the prediction indicator may indicate whether the target data entry is a confirmed target data entry or a rejected target data entry. The system 100 is further configured to determine a confidence level for a prediction indicator. For example, each prediction indicator may have a confidence level provided. The confidence level indicates the probability that the associated prediction indicator correctly identifies a target data entry as a confirmed target data entry. In other words, the confidence level is a value that the system 100 generates to show how likely a prediction is correct in identifying the presence of an anomaly (or in identifying the presence of no anomaly). Since the target data entry is either confirmed or rejected, the system 100 considers the target data entry as confirmed if the system 100 determines it is more likely the target data entry does include an anomaly than does not. Similarly, the system 100 considers the target data entry as rejected if the system 100 determines it is more likely the target data entry does not include an anomaly than does. Thus, the confidence level is provided with respect to the likelihood of the target data entry being confirmed.

For example, the confidence level is provided on a scale from 0 to 1, a value at or above 0.5 would correlate to a prediction indicator of confirmed and a value below 0.5 would correlate to a prediction indicator of rejected. In another example, the confidence level is provided as a percentage value. A percentage value of 25% would indicate a 25% chance the target data entry includes an anomaly; thus, the prediction indicator would provide a rejected indicator. Alternatively, if the percentage value was 75%, the prediction indicator would provide a confirmed indicator. The system 100 is also configured to display the bundles with the corresponding prediction indicators and the corresponding confidence levels on a graphical user interface (GUI). The system 100 displays the bundles and associated information in a way that can be easily understood; for example, the system 100 displays the information in rows that can be sorted according to various functions, in a data format determined based on comparison of data values in the rows, and with a data value that indicates the comparison.

The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 is a diagram showing an example of a system for grouping, identifying and predicting an anomaly in data entries, and generating performance metrics using an optional machine learning model. FIG. 1 includes the system 100 that comprises a user equipment (UE) 103 (interacted with by a user 101) that includes application(s) 105 and sensor(s) 107, a communication network 109, an analysis platform 111, and a database 123.

In one instance, the user 101 is a professional entity (e.g., primary care physician, specialty physician, general surgeon, specialty surgeon, clinician, medical resident, medical practitioner, nurses, etc.) that engages with the system and provides medical-related services to one or more patient. In another instance, user 101 is an insurance provider providing claim-related services to one or more members. In another instance, user 101 includes any professional that provides information that can be later analyzed (e.g., by a reviewer 125 using analysis platform 111) to find trends and anomalies (e.g., statistician, meteorologist, economist, market researcher, demographer, sociologist, political analyst, scientist, etc.). In aspects of the present disclosure, user 101 shares one or more of health-related information (e.g., stress level, blood pressure level, body temperature, etc.), claim-related information (e.g., payment amount, authorization, service provider, etc.), weather-related information (e.g., daily temperature, dew point, pressure, precipitation, etc.), economy-related information (e.g., unemployment rate, GDP growth, net imports/exports, inflation rate, etc.), political-related information (e.g., approval rating, funding, policies, etc.) that assists system 100 in creating a data set to be analyzed. In one instance, the health-related information, claim-related information, weather-related information, economy-related information, and/or political-related information are collected through various data collection mechanisms that collect data from a plurality of data sources (e.g., the database 123, the local database 127, the server database 129, the UE 103, and/or any other databases necessary).

In one instance, the UE 103 includes, but is not restricted to, any type of mobile terminal, wireless terminal, fixed terminal, or portable terminal. Examples of the UE 103, include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 facilitates various input means for receiving and generating information, including, but not restricted to, a touch screen capability, a keyboard, and keypad data entry, a voice-based input mechanism, and the like. Any known and future implementations of the UE 103 are also applicable.

In one instance, the application 105 includes various applications such as, but not restricted to, content provisioning applications, software applications, networking applications, multimedia applications, media player applications, camera/imaging applications, storage services, contextual information determination services, location-based services, notification services, social networking services, and the like. In one embodiment, one of the applications 105 at the UE 103 acts as a client for the analysis platform 111 and performs one or more functions associated with the functions of the analysis platform 111 by interacting with the analysis platform 111 over the communication network 109. In one example, UE 103 receives data and stores the data in a local database 127 (e.g., a database table) such that, over time, local database 127 compiles data from UE 103 to provide to analysis platform 111. In the same example or a different example, UE 103 uploads data to server database 129 (e.g., a database table) via communication network 109. Server database 129 stores data from one or more UE 103 to generate a data set for analysis platform 111. In this way, data for system 100 is stored in local database 127 and/or server database 129. The database 123 (e.g., a database table) then used by the analysis platform 111 includes local database 127, server database 129 and/or other databases necessary such as a system database, historical database, etc.

By way of example, the sensor 107 includes any type of sensor. In one instance, the sensors 107 include, for example, a network detection sensor for detecting wireless signals or receivers for different short-range communications (e.g., Bluetooth, Wi-Fi, Li-Fi, near field communication (NFC), etc.), a global positioning sensor for gathering location data, a camera/imaging sensor for gathering image data, an audio recorder for gathering audio data, and the like. In another instance, the sensors 107 include, for example, inertial measurement unit (IMU) sensors, electrocardiogram (ECG) sensors, sensors to detect blood glucose level, sensors to measure respiration rate, heart rate detection sensors (e.g., optical Heart Rate (PPG) sensor), sensors to monitor body temperature, micro-electro-mechanical system (MEMS) based miniature motion sensors, gyroscope, accelerometer, magnetometer, infrared sensor, microphone, gas sensor, etc. In one example sensors 107 include any type of sensor necessary to facilitate receiving information for analysis and/or providing information to analysis platform 111 via communication network 109.

In one instance, various elements of the system 100 communicate with each other through the communication network 109. The communication network 109 supports a variety of different communication protocols and communication techniques. In one embodiment, the communication network 109 allows the analysis platform 111 to communicate with the UE 103. The communication network 109 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, the analysis platform 111 is a platform with multiple interconnected components. The analysis platform 111 includes one or more servers, intelligent networking devices, computing devices, components, and corresponding software for identifying data needed to be reviewed by reviewer 125 and predicting, from the identified data, which data entries include anomalies. In addition, it is noted that the analysis platform 111 may be a separate entity of the system 100.

The analysis platform 111 groups data rows from a database table, identifies, in real-time, data entries that are provided for reference (e.g., reference data entries) and data entries that are provided for analysis (e.g., target data entries), and generates performance metrics based on the newly grouped data. The analysis platform 111 predicts which of the target data entries include anomalies (e.g., excessive resource allocation, statistical outliers, etc.). In one embodiment, the analysis platform 111 implements a unique machine learning based excessive resource allocation mechanism to generate prediction indicators for reviewer 125 and confidence scores related to each prediction indicator. The amount of excessive resource allocation (e.g., unauthorized action, anomalous activity, or an overpayment) identified and the confidence score, in combination, provides reviewer 125 the expected value (e.g., the amount of resource that will be returned) for specific target data entries. In an aspect, reviewer 125 is part of the functions of analysis platform 111 (e.g., analysis platform 111 performs the review process). In another aspect, reviewer 125 is separate to analysis platform 111. Reviewer 125 can be a user 101.

In one embodiment, the analysis platform 111 includes a data collection module 113, a data processing module 115, a machine learning module 117, a recommendation module 119, a user interface module 121, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one embodiment, the data collection module 113 collects relevant data, as described above, for analysis by analysis platform 111. In one embodiment, the data collection module 113 uses a web-crawling component to access various databases (e.g., database 123, local database 127, server database 129, or other information sources (e.g., third-party databases), to collect relevant data. In one embodiment, the data collection module 113 includes various software applications (e.g., data mining applications in Extended Meta Language (XML)) that automatically search for and return relevant data. In one example, the data collection module 113 collects data provided by user 101. The data provided by user 101 includes one or more categories (e.g., unique user identifier, provider, prescription history, diagnosis, dew point, daily temperature, batting average, inflation rate, approval rating, etc.) as described above. In one embodiment, the collection of relevant data is automated.

In one embodiment, the data collection module 113 transmits the collected data to the data processing module 115. The data processing module 115 performs data standardization and/or data cleansing on the collected data. In one instance, data standardization includes standardizing and unifying data so that the data are easily processed by other modules. In one instance, the data cleansing includes removing or correcting erroneous data (e.g., redundant or incomplete data) to create high-quality data or validating and correcting values against a known list of entities. The data cleansing technique also includes data enhancement, where data is made more complete by adding related information. In aspects of the present disclosure, data processing module 115 is configured to group data entries based on a selection criteria (e.g., rule(s)).

Data processing module 115 groups data entries with one or more related categories. In an example, data processing module 115 groups data entries based on the unique user identifier. In another example, data processing module 115 groups data entries based on a combination of prescription medication and provider. In yet another example, data processing module 115 groups data entries based on a combination of approval rating and funding. Data processing module 115 is configured to group data based on any rule provided based on one or more categories of the data entries provided to analysis platform 111. The data is then subjected to various data processing methods using one or more optional machine learning and artificial intelligence algorithms to identify target data entries, generate prediction indicators, and generate confidence levels.

In one embodiment, the machine learning module 117 is configured for unsupervised machine learning that does not require training using known outcomes 618, as described below and shown in FIG. 6. Unsupervised machine learning utilizes machine learning algorithms to analyze and cluster unlabeled data sets and discover hidden patterns or data groupings (e.g., similarities and differences within data), without supervision. In one example, unsupervised machine learning techniques implement approaches that include clustering (e.g., deep embedded clustering, K-means clustering, hierarchical clustering, probabilistic clustering), association rules, classification, principal component analysis (PCA), or the like. The machine learning module 117 utilizes unsupervised machine learning techniques to identify target data entries and predict target data entries with anomalies.

Figure 6:
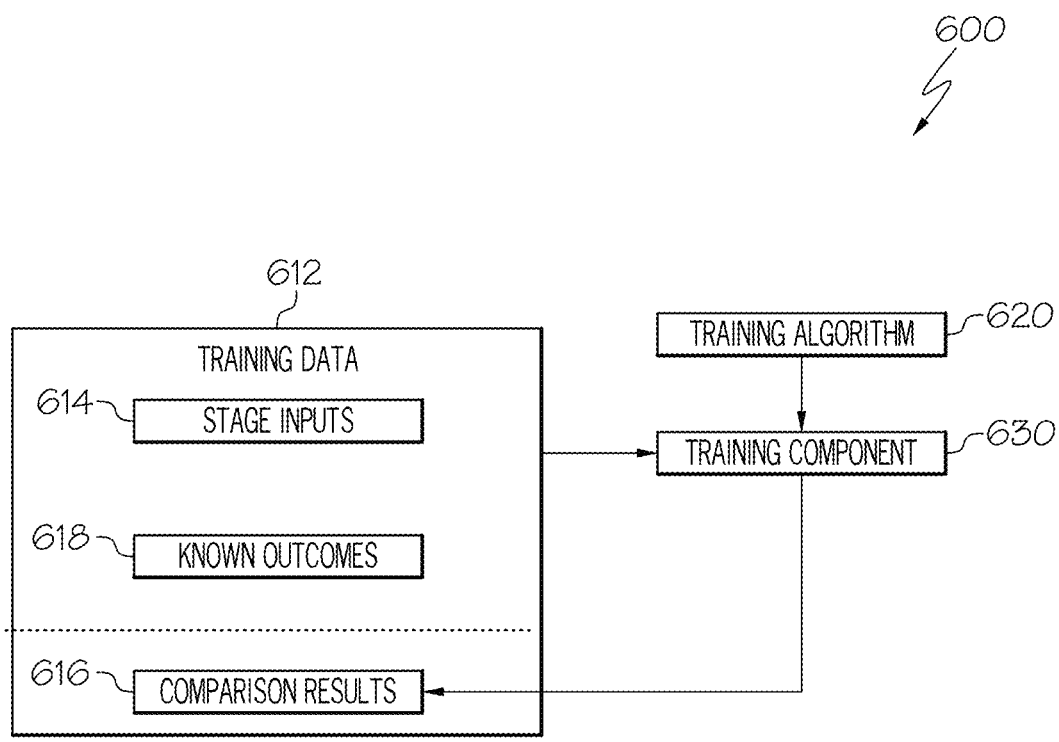
FIG. 6 shows an example machine learning training flowchart.

In one embodiment, the machine learning module 117 is additionally or alternatively configured for supervised machine learning techniques that utilize training data (e.g., training data 612 illustrated in the training flowchart 600 of FIG. 6), for training a machine learning model configured to identify target data entries, generate prediction indicators for target data entries with anomalies (e.g., excessive resource allocation), and generate confidence levels for the predictions. In one example, the machine learning module 117 performs model training using training data, e.g., data from other modules that contains input and correct output, to allow the model to learn over time. The training is performed based on the deviation of a processed result from a documented result when the inputs are fed into the machine learning model, e.g., an algorithm measures accuracy through a loss function, adjusting until the error has been sufficiently minimized. In one embodiment, the machine learning module 117 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 117 implements various machine learning techniques, e.g., K-nearest neighbors, cox proportional hazards model, decision tree learning, association rule learning, neural network (e.g., recurrent neural networks, graph convolutional neural networks, deep neural networks), regression, inductive programming logic, support vector machines, Bayesian models, Gradient boosted machines (GBM), LightGBM (LGBM), Xtra tree classifier, etc.

In one embodiment, the machine learning module 117 implements natural language processing (NLP) techniques to analyze, understand, and derive meaning from the data. In another embodiment, a separate NLP module implements the NLP techniques such that machine learning is not needed for NLP to be applied. In yet another embodiment, both machine learning module 117 and a separate NLP module implement the NLP techniques. NLP is applied to analyze text, allowing machines to understand how humans speak/write, enabling real-world applications such as automatic text summarization, sentiment analysis, topic extraction, named entity recognition, parts-of-speech/text tagging, relationship extraction, stemming, and/or the like. In one embodiment, NLP generally encompasses techniques including, but not limited to, keyword search, finding relationships (e.g., synonyms, hypernyms, hyponyms, and meronyms), extracting information (e.g., keywords, key phrases, search terms), classifying, and determining positive/negative sentiment of documents. In one example, the machine learning module 117 utilizes NLP to recognize different ways of conveying the same information (e.g., recognizing "1/1/2000" is the same as "January 1, 2001", or recognizing "1 tab bid for 30" is the same as "take one tablet twice a day for 30 days").

According to aspects of the present invention, machine learning module 117 is configured to identify reference data entries and target data entries. In an example, the target data entries are data entries that have been determined to potentially include an anomaly while reference data entries are data entries that validate and/or assist analysis platform 111 to determine if the target data entries include anomalies. The groups of data entries provided by data processing module 115 to machine learning module 117 include a combination of one or more reference data entries and one or more target data entries. Machine learning module 117 is configured to analyze the target data entries with the respective reference data entries to predict which target data entries include anomalies (e.g., provide a prediction indicator indicative of a target data entry having excessive resource allocation). Machine learning module 117 is also configured to generate a confidence level to inform reviewer 125 the likelihood of the prediction being correct.

In one embodiment, the machine learning module 117 transmits the prediction indicators and confidence levels to the recommendation module 119 for further processing. In one instance, the recommendation module 119 determines which data entries the reviewer 125 should analyze. Recommendation module 119 is configured to provide the data entries to reviewer 125 in a form (e.g., via one or more elements of a graphical user interface) that allows the reviewer 125 to efficiently analyze the data entries. In an example, recommendation module 119 provides the groups of data entries to reviewer 125 via user interface module 121 based on the amount of target data entries within the group. In an example, recommendation module 119 provides the groups of data entries to reviewer 125 via user interface module 121 based on the amount of target data entries predicted to have an anomaly within the group. In another example, recommendation module 119 provides the groups of data entries to reviewer 125 via user interface module 121 based on the group confidence level (e.g., group score) which is determined by aggregating the confidence level of each target data entry within the group. In another example, recommendation module 119 provides the groups of data entries to reviewer 125 via user interface module 121 based on the total amount of excessive resource allocation within the group. In yet another example, recommendation module 119 provides the groups of data entries to reviewer 125 via user interface module 121 based on the group expected value which is determined by aggregating the expected value of each target data entry within the group.

In one embodiment, the recommendation module 119 transmits the analyzed data to the user interface module 121. The user interface module 121 enables a presentation of a graphical user interface (GUI) in the UE 103 that facilitates notifications and visualizations of the data and enables a presentation of a GUI for the reviewer 125. The user interface module 121 employs various application programming interfaces (APIs) or other function calls corresponding to the application 105 on the UE 103, thus enabling the display of graphics primitives such as icons (e.g., flags), bar graphs, menus, buttons, data entry fields, groups of data entries, lists, etc. In another embodiment, the user interface module 121 causes interfacing of guidance information to include, at least in part, one or more annotations, audio messages, video messages, or a combination thereof pertaining to the notification (e.g., a notification of excessive resource allocation). In one example embodiment, the user interface module 121 operates in connection with augmented reality (AR) processing techniques, wherein various applications, graphic elements, and features interact to present anomaly notifications in a format that is understandable by the recipients (e.g., reviewer 125).

The above-described modules and components of the analysis platform 111 are implemented in hardware, firmware, software, or a combination thereof. Though depicted as a separate entity in FIG. 1, it is contemplated that the analysis platform 111 is also implemented for direct operation by the respective UE 103. As such, the analysis platform 111 generates direct signal inputs by way of the operating system of the UE 103. In another embodiment, one or more of the modules 113-121 are implemented for operation by the respective UEs, as the analysis platform 111. The various executions presented herein contemplate any and all arrangements and models.

In one embodiment, the database 123 is any type of database, such as relational, hierarchical, object-oriented, and/or the like, wherein data is organized in any suitable manner, including data tables or lookup tables. In one embodiment, the database 123 accesses or includes any suitable data that may be utilized by analysis platform 111. In one embodiment, the database 123 stores content associated with local database 127 and server database 129. It is understood that any other suitable data may be included in the database 123.

In one embodiment, the database 123 includes a machine-learning based training database with a pre-defined mapping defining a relationship between various input parameters and output parameters based on various statistical methods. For example, the training database includes machine-learning algorithms to learn mappings between input parameters related to the user 101 and/or to a separate subject (e.g., health-related information, work-related information, lifestyle data, and personal information). In an aspect, the training database includes machine-learning algorithms to learn mappings between input parameters related to a patient and/or a subscriber. In one instance, the training database includes a data set that includes data collections that are not subject-specific (e.g., data collections based on population-wide observations, local, regional or super-regional observations, industry observations, sector observations, company observations, and the like). Example data sets include demographic data, claim data, frequency data, meteorological data, scientific and medical-related periodicals and journals, research studies data, nutritional data, exercise data, physician and hospital/clinic location data, economic data, political data, and the like. The training database is routinely updated and/or supplemented based on machine learning methods.

By way of example, the UE 103, the analysis platform 111, and the database 123 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
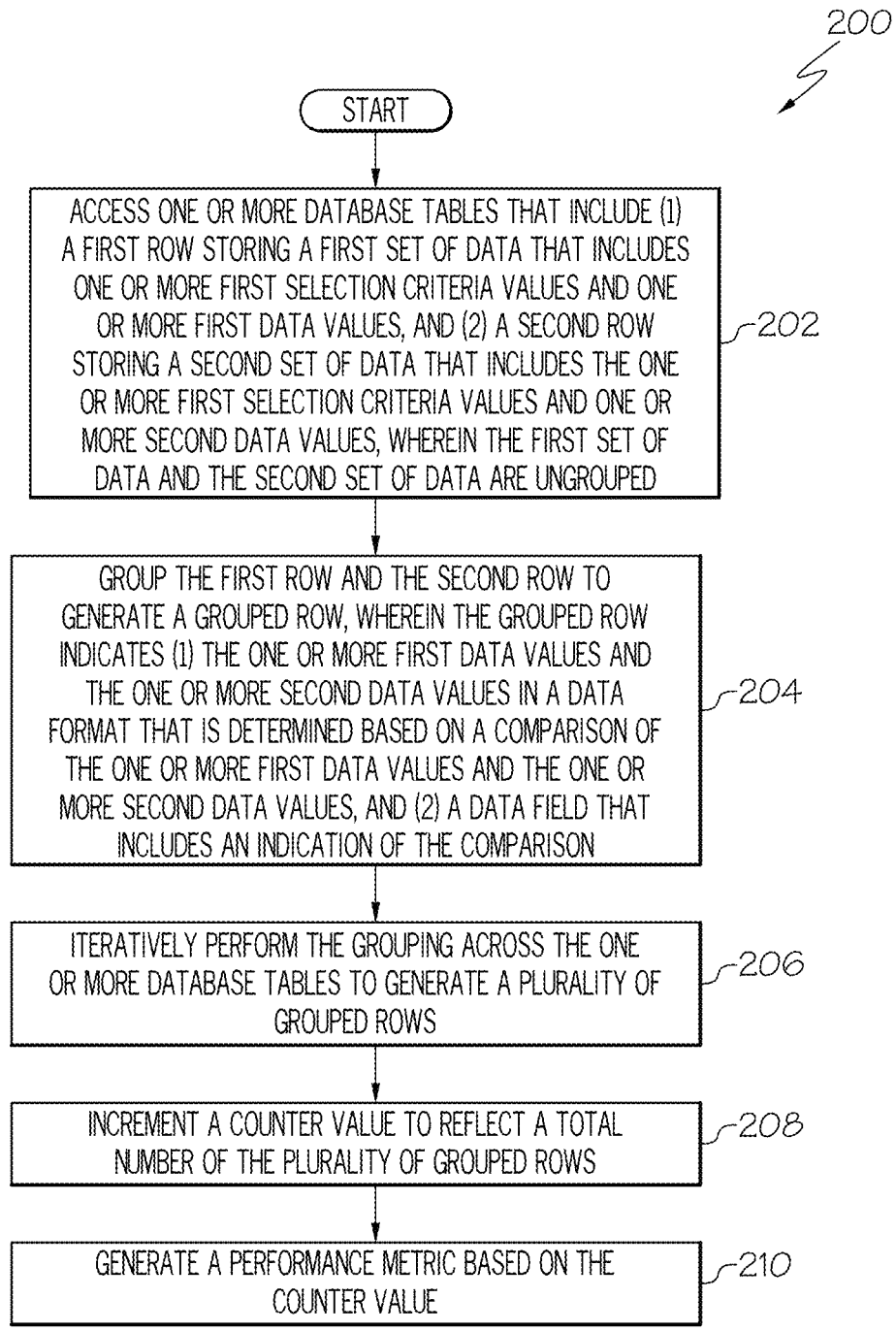
FIG. 2 is a flowchart of a process for accessing database tables with rows storing sets of data and grouping the accessed rows into grouped rows, according to aspects of the disclosure.
Figure 7:
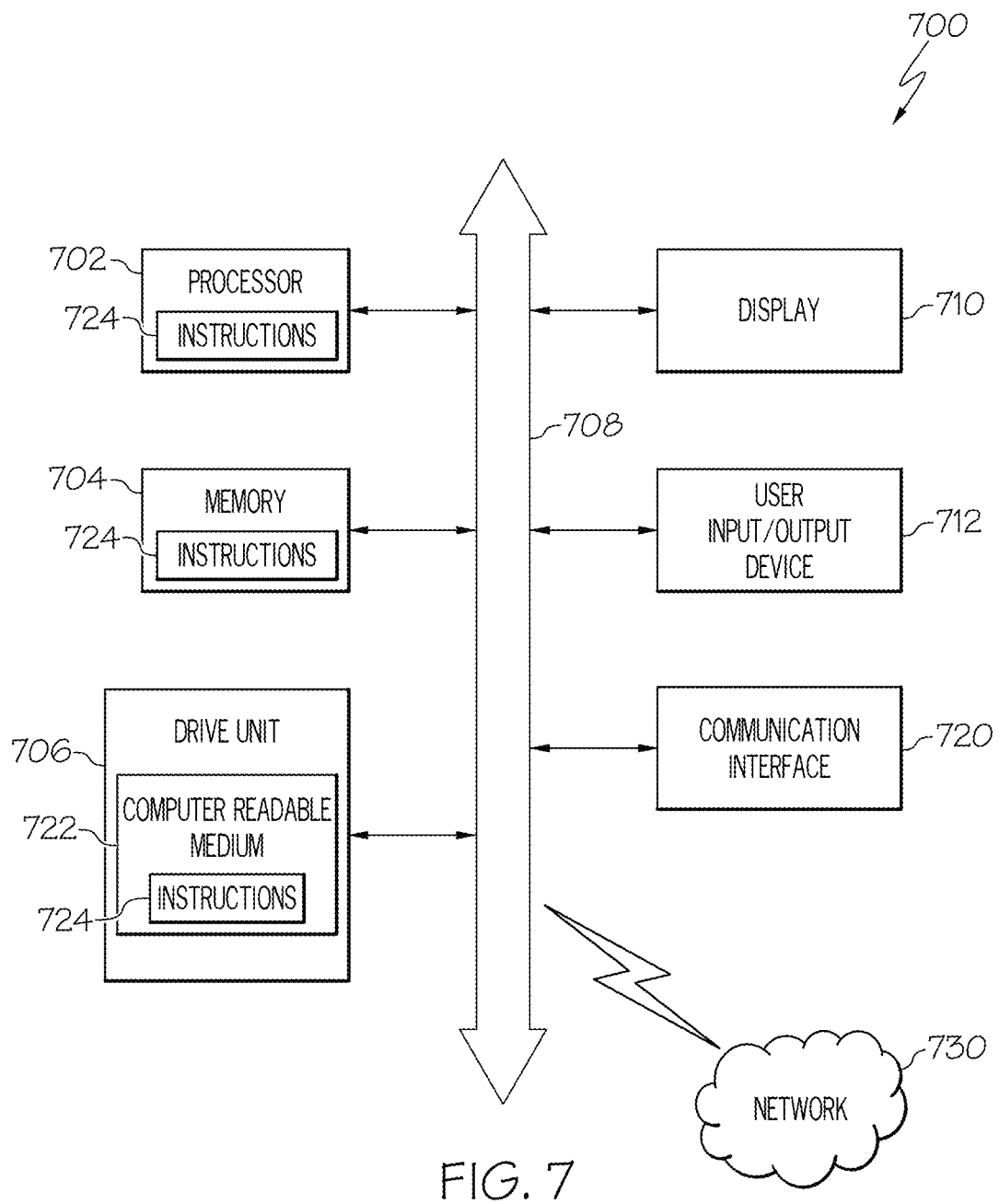
FIG. 7 illustrates an implementation of a computer system that executes techniques presented herein.

FIG. 2 is a flowchart of a process for accessing database tables with rows storing sets of data and grouping the accessed rows into grouped rows, according to aspects of the disclosure. In various embodiments, the analysis platform 111 and/or any of the modules 113-121 performs one or more portions of the process 200 and are implemented using, for instance, a chip set including a processor and a memory as shown in FIG. 7. As such, the analysis platform 111 and/or any of modules 113-121 provide means for accomplishing various parts of the process 200, as well as means for accomplishing embodiments of other processes described herein in conjunction with other components of the system 100. Although the process 200 is illustrated and described as a sequence of steps, it is contemplated that various embodiments of the process 200 are performed in any order or combination and need not include all of the illustrated steps.

Figure 5A:
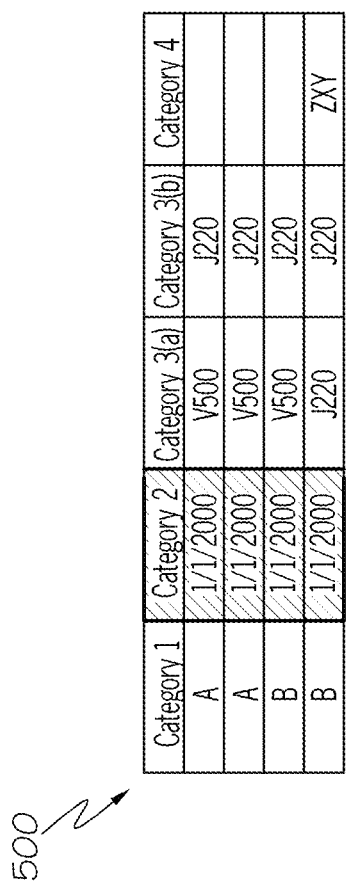
FIGS. 5A-5B are tables showing exemplary data entries with a selection criteria, according to aspects of the disclosure.

In step 202, the data collection module 113 of analysis platform 111 accesses one or more database tables (e.g., database 123, local database 127, server database 129, etc.) that include at least a first and a second row storing a first and a second set of data. The data entries include data related to one or more categories (e.g., user identifier, provider, dew point, approval rating, etc.) as described above. The first row stores a first set of data with one or more first selection criteria values and one or more first data values, while the second row stores a second set of data with the one or more first selection criteria values and one or more second data values. In other words, some data from the first row and the second row are the same, while other data are different. FIG. 5A shows an example with data entries having data related to five separate categories. In another example, FIG. 3A shows data entries with data related to a user identifier and a resource request (e.g., insurance claims, player analytics, etc.).

In step 204, the data processing module 115 of analysis platform 111, in response to determining that the first set of data and the second set of data share the first selection criteria value (e.g., rule), groups the first row and the second row to generate a third row (e.g., a grouped row). The third row indicates the one or more first data values and the one or more second data values in a data format that is determined based on a comparison of the one or more first data values and the one or more second data values, and indicates a data field that includes an indication of the comparison. In an embodiment, the selection criteria is related to only one category, e.g., a unique user identifier. In this example, the data entries are grouped by the unique user identifier. In another embodiment, the selection criteria is related to two or more categories, e.g., provider and prescription frequency. In this example, the data entries are grouped by a combination of provider and prescription frequency (for example, all data entries with the same provider and at least two doses of medication a month are grouped together).

For example, each group of data entries is a subgroup of the data set such that each data entry within the group has the same values for the selection criteria. In an example, all data entries within a group have the same unique user identifier. In another example, all data entries within a group have the same medication frequency. In yet another example, all data entries within a group have the same daily temperature and dew point. It is contemplated in the present disclosure that any combination of the categories listed above can be part of the selection criteria. The groups are formed in a way that either a category or a combination of categories (e.g., a rule) are the same for each data entry in the group.

In step 206, the data processing module 115 of analysis platform 111 iteratively performs the grouping step 204 to generate a plurality of additional new rows, each of these rows containing data extracted from more than one of the earlier-provided rows. That is, the data from the database tables are grouped into new rows depending on the selection criteria. These new rows are considered bundles or groups as they contain data extracted from a plurality of other rows, such as rows provided in the one or more above-described database tables.

In step 208, the data processing module 115 of analysis platform 111 increments a counter value to reflect a total number of the plurality of rows. For example, the counter value identifies the row that includes the bundle. In other words, the first newly-generated row (e.g., bundle or group) includes a unique alphanumerical indicator such as "Group_0001" or "Bundle_0001" to indicate it is the first bundle. The second generated row includes a unique alphanumerical indicator such as "Group_0002" or "Bundle_0002" to indicate it is the second bundle. In another example, each generated row may include a symbol, an image, or any other counter value to indicate the current number of rows generated. The counter value may be provided to indicate the current and total number of rows generated (e.g., "Group 1 of 10").

In step 210, the recommendation module 119 of the analysis platform 111 generates a performance metric based on the counter value. As will be further described below, the performance metric is indicative of information regarding the grouped data as a whole, such as, for example, how many data rows are included in each grouped data row, how many grouped data rows satisfy a specified criteria, etc. These performance metrics are based on metadata, for example. The performance metrics assist a user or downstream computing system in understanding statistics of the data, or may in analyzing the data. For example, 150 out of 1000 rows of data include a certain value or combination of values. However, after the data is grouped, only two out of 25 groups of data include this value or combination of values. It is easier for the user/reviewer or downstream system to analyze the data and generate the performance metric by reviewing only 25 groups instead of 1000 rows. Additionally, the performance metric is more accurate when considering grouped rows because grouping can eliminate duplicate rows and exclude irrelevant data entry rows (e.g., reference data). In this example, the performance metric for grouped rows is 8%, compared to 15% for the ungrouped rows, providing a more accurate representation of the data.

In an optional step, the machine learning module 117 of analysis platform 111 applies a machine learning model to the data entries (preferably after being grouped) that has been trained to identify each data entry as a reference data entry (e.g., a data entry that assists in determining anomalies within target data entries) or a target data entry (e.g., a data entry that possibly has an anomaly). In one embodiment, identifying the data entries includes the analysis platform 111 cross-referencing each data entry with one another to find similarities. That is, the machine learning model analyzes the relationship of each data entry with one another to find data entries that help to validate other data entries. In one instance, the machine learning model includes a deep embedded clustering algorithm or a K-means clustering algorithm. In another embodiment, data processing module 115 and/or recommendation module 119 is capable of identifying data entries as reference data entries or target data entries.

In an optional step, the machine learning module 117 and/or the recommendation module 119 of analysis platform 111 determines, based on the application of the machine learning model to the data, a prediction indicator for each target data entry. The prediction indicator indicates whether the target data entry is a confirmed target data entry (e.g., the target data entry does have an anomaly) or a rejected target data entry (e.g., the target data entry does not have an anomaly).

In an optional step, the machine learning module 117 and/or the recommendation module 119 of analysis platform 111 determines, based on the application of the machine learning model to the data, a confidence level for each prediction indicator. The confidence level indicates the probability that a target data entry has been correctly identified as including an anomaly or not including an anomaly. In an example, the confidence level is provided on a scale from 0 to 1. In another example, the confidence level is provided as a percentage value from 0% to 100%. In yet another example, the confidence value is provided on a scale from 0 to 50. The present disclosure contemplates that the confidence level can be provided as any value and scale understood to be indicative of a probability. In an example, the confidence level is provided in terms of how likely the target data entry is a confirmed target data entry. In this way, with a scale of 0 to 1, a 0 indicates no chance and a 1 indicates a guaranteed chance. Further, a value at or above 0.5 would indicate the data entry is more likely to be confirmed than rejected, and a value below 0.5 would indicate the data entry is more likely to be rejected that confirmed. In a different example, the confidence level is provided on two scales depending if the associated target data entry is predicted as rejected or confirmed. In this example, a rejected target data entry probability is provided from 0 to 1 while a confirmed target data entry probability is also provided from 0 to 1, the former scale indicating the likelihood of the rejected target data entry being rejected and the latter scale indicating the likelihood of the confirmed target data entry being confirmed. In one embodiment, the analysis platform 111 updates the confidence level and/or prediction indicator in real-time, near real-time, or on a scheduled basis to dynamically determine the likelihood of an anomaly in a target data entry In an optional step, the user interface module 121 of analysis platform 111 causes the groups and their corresponding prediction indicators and confidence levels to be displayed on a graphical user interface (GUI). As described above, any GUI known in the field is contemplated in the present disclosure. In an example, the GUI is a mobile communication device. In another example, the GUI is a desktop computer device. In yet another example, the GUI is a handheld device.

FIGS. 3A-3D are diagrams that illustrate a process for identifying and predicting an anomaly in data entries according to aspects of the disclosure. Specifically, FIG. 3A shows a data set 300 of a database table that is not sorted. Data set 300 includes a first category labeled as user identifier 302 and a second category labeled as resource request 304. The data set 300 includes a plurality of data entries 306, each data entry 306 including a user identifier 302 value and a resource request 304 value. In an example, one data entry 306 includes value 308 as "E" for the user identifier 302 and value 310 as "5" for the resource request 304. FIG. 3B shows a data set 326 that is sorted. In FIG. 3B, data set 326 is shown which is data set 300 but with grouped data entries. As described above, data set 326 is generated by analysis platform 111 accessing a selection criteria and assigning each data entry 306 to a group depending on the selection criteria. In this example illustrated in FIG. 3B, the data entries 306 are grouped by their user identifier 302 value. Group 328 includes all data entries with an "A" user identifier 302, Group 330 includes all data entries with a "B" user identifier 302, Group 332 includes all data entries with a "C" user identifier 302, Group 334 includes all data entries with a "D" user identifier 302, and Group 336 includes all data entries with an "E" user identifier 302.

FIG. 3C shows the application of the system (e.g., one or more of the modules of the analysis platform 111) to the data set 326, according to aspects of the present disclosure. Data set 352 is the data set 326 with additional analysis. Data set 352 includes user identifier 302, resource request 304, prediction indicator 354, confidence level 356, amount of ERA 358 (excessive resource allocation), and expected value 360. Resource request 304 or resource request(s) 382 values shown in the accompanied figures are exemplary to show different requests (e.g., separating request "1" from request "2") and are not indicative of the amount of resource allocation for the request. As described above, in an example an anomaly in a data entry correlates to excessive resource allocation within that data entry. The data entries have been identified, by the machine learning model or by the analysis platform 111 without the presence of machine learning, as a reference data entry 362 or a target data entry 364. Prediction indicator 354 shows a value of "CONFIRMED" or "REJECTED" for target data entries 364 to indicate whether the target data entry 364 includes an anomaly or does not include an anomaly (e.g., an excessive resource allocation). In this example, confidence level 356 is provided as a value on a scale from 0 to 1, where a value at or above 0.5 indicates the target data entry 364 is more likely to be confirmed than rejected and where a value below 0.5 indicates the target data entry 364 is more likely to be rejected than confirmed (thus, prediction indicator 354 of CONFIRMED is provided for a confidence level 356 at or above 0.5 and prediction indicator 354 of REJECTED is provided for a confidence level 356 below 0.5). In an example, amount of ERA 358 is a monetary value (e.g., dollars). In another example, amount of ERA 358 is a data value (e.g., bytes). In this example, expected value 360 is calculated to determine the amount of excessive resource allocation that is expected to be realized for a given target data entry 364. Specifically, expected value 360 is the confidence level 356 of the target data entry 364 multiplied by the amount of ERA 358 of the target data entry 364.

FIG. 3D shows further analysis of the data set 352, according to aspects of the present disclosure. Data set 378 is the data set 352 in a condensed form and with additional analysis. For example, data set 378 shows a group value 380 for each group instead of showing each individual data entry. As an example, group 328 is the group of data entries with user identifier "A" and includes resource requests 2, 4, 3, and 1. The resource requests are listed within the resource request(s) 382 value. The group score 384 and the group EV 386 (expected value) for each group is shown. The group score 384 is an aggregation of each confidence level 356 within that group. The aggregation of each confidence level 356 is performed by one or more methods. In an example, the aggregation is performed using an arithmetic average function. In an example, the aggregation is performed using a geometric average function. In an example, the aggregation is performed using a median function. In an example, the aggregation is performed using a mode function. In an example, the aggregation is done by using a sum function. In an example, the aggregation is done performed a standard deviation function. In an example, the aggregation is performed using a variance function. Other methods of data aggregation are contemplated in the present disclosure, in addition to or instead of the above-described examples.

In the example shown in FIG. 3D, the group score 384 is calculated using probabilistic analysis. More specifically, since each target data entry is entirely independent, the group score can be calculated by finding the probability that at least one target data entry is confirmed. For example, each confidence level 356 within a group 380 is added together to generate a sum. Then, each confidence level 356 for the group 380 is multiplied with one another to calculate a product. This product is subtracted from the sum.

In the case of a group 380 having more than two confidence levels 356, such as Group 336, each of the confidence levels 356 are multiplied with one another to calculate a plurality of products, one product for each possible pair of confidence levels, and another product calculated by multiplying all (i.e., more than two) confidence values. Each of those products are subtracted from the sum. For example, the group score for group 336 is found as follows:

P(5 or 2 or 3)=P(5)+P(2)+P(3)−P(5 and 2)−P(5 and 3)−P(2 and 3)−P(5 and 2 and 3)
P(5 or 2 or 3)=0.43+0.62+0.57−(0.43*0.62)−(0.43*0.57)−(0.62*0.57)+(0.43*0.62*0.57)
P(5 or 2 or 3)=0.907

Thus, the group score 384 for Group 336 is represented as 0.91 in FIG. 3D as this is the probability that at least one target data entry 364 within Group 336 is a confirmed target data entry. The group EV 386 is calculated to determine the amount of excessive resource allocation that is expected to be realized for a given group 380. Specifically, group EV 386 is calculated by summing the expected value of each target data entry 364 within a group.

FIGS. 4A-4B are tables that illustrate a sorting process using the exemplary values of FIGS. 3A-3D, according to aspects of the present disclosure. Specifically, FIG. 4A shows a display 400 (e.g., of a GUI presented with user interface module 121) that includes group data 380, user identifier 302, resource request(s) 382, group score 384, and group EV 386. As can be seen, the groups are ordered in the display by their respective group score 384. In other words, the highest group score 384 is at the top, and the lowest score is at the bottom. In this way, a reviewer can review in order of group score 384, which is indicative of how likely a confirmed target data entry is within a group. In the illustrated example, Group 236 is the most likely, and Group 230 is the least likely.

FIG. 4B shows a display 430 (e.g., of a GUI presented with user interface module 121) that includes group data 380, user identifier 302, resource request(s) 382, group score 384, and group EV 386. As can be seen, the groups are ordered in the display by their respective group EV 386. In other words, the highest group EV 386 is at the top, and the lowest group EV 386 is at the bottom. In this way, a reviewer can review in order of group EV 386, which is indicative of how much excessive resource allocation a reviewer can expect to reclaim from the group. In this example, Group 228 has the most, and Group 230 has the least. By providing these groups in unique ways, a reviewer can decide the most effective and efficient way to review the sorted data as presented on the display 430.

Figure 5B:
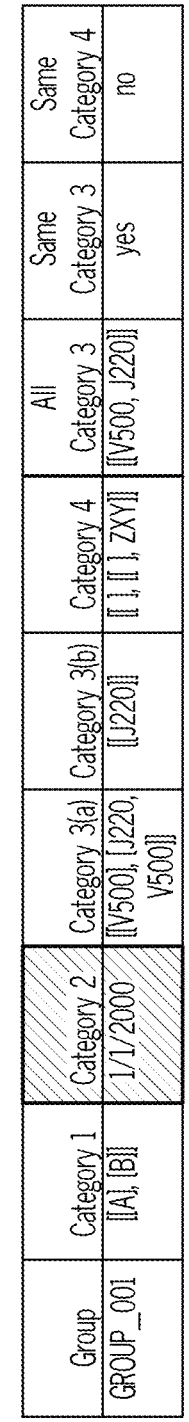

FIGS. 5A-5B are tables showing exemplary data entries with selection criteria, according to aspects of the disclosure. Specifically, FIG. 5A shows a database table 500 according to an example. Database table 500 includes four data entries with values correlating to a Category 1, a Category 2, a Category 3 (broken into two subcategories of Category 3(a) and Category 3(b)), and a Category 4. The data entries are provided in a plurality of rows, each row including a set of data. In an example, database table 500 is a portion of a larger database table (e.g., data set 326) that has been sorted into groups for further analysis and/or presentation on a display. As illustrated with the bolded lines surrounding the cell, Category 2, in this example, is the selection criteria. In other words, Category 2 determines the data category used by analysis platform 111 to group the data. It can be seen that each set of data in a row in the database table 500 has the same Category 2 value (e.g., 1/1/2000). Thus, each row stores a different data set while also having one or more selection criteria values shared between one another.

FIG. 5B shows an example of data entries of database table 500 that were compiled into a compact form. Grouped row 550 is shown as a single data entry with a new label "GROUP_001". This label is a counter value that is incremented each time a new grouped row is generated. As can be seen, the data from each data entry of database table 500 is now represented by one data entry identified as GROUP_001.

In the example shown, database table 500 is split into two sub-data sets related to the values "A" and "B" from Category 1 (both of which have the same Category 2 value since that is the selection criteria). Grouped row 550 keeps these sub-data sets by providing the information in GROUP_001 in brackets separated by commas. Category 1 includes values "A" and "B," and therefore GROUP_001 provides the value "[[A], [B]]" where the inner brackets separate the sub-data sets.

As an example, Category 3(a) is provided as "[[V500], [J220, V500]]" in GROUP_001 because sub-data set from "A" includes only V500 and sub-data set "B" includes both "J220" and "V500" (e.g., the first V500 is separated from J220 and the second V500 with a comma while J220 and V500 have brackets around the values with a comma inside of the brackets to indicate both values are from the same sub-data set). In this way, grouped row 550 (and other grouped rows iteratively generated) indicate the one or more first data values from the first row/data set and the one or more second data values from the second row/data set in a data format that is determined based on a comparison of data from the first and second rows and generates a data field that includes an indication of the comparison.

With continued reference to the example of Category 3(a) in FIG. 5B, analysis platform 111 determines whether data values are common to the grouped rows by comparing the first and second data values and represents this commonality, or lack of commonality, in grouped row 550. In the illustrated example, the presence of internal brackets indicates lack of commonality (e.g., "[[V500], [J220, V500]]") indicates a lack of commonality as no row in which Category 1 contains value "A" contains "J220." Thus, the data for Category 3(a) in grouped row 550 indicates that "V500" is associated with rows in which Category 1 includes value "A," and that both "J220" and "V500" are associated with rows in which Category 1 includes value "B."

In another example (not shown in FIG. 5B), the value of Category 3(a) for grouped row 550 is "[[J220, V500]]," which lacks internal brackets. This lack of internal brackets indicates commonality and represents a determination that Category 3(a) has values of both J220 and V500 for rows in which Category 1 includes value "A" and rows in which Category 1 includes value "B". Accordingly, the presence or absence of internal brackets forms an example of a graphical representation of lack of commonality or commonality, respectfully.

Moreover, as seen with Category 4, a row of data includes data associated with categories that a different row does not. Thus, the data field indicates a blank data value for the category when comparing the rows of data, similar to indicating a same or different data value for other categories.

For example, flags are provided for this data, leading to greater insight into the data presented. Grouped row 550 includes "All Category 3" flag, "Same Category 3" flag, and "Same Category 4" flag. These flags are examples of binary flags (e.g., yes/no flags or 1/0 flags) or multi-value flags (e.g., the flag shown in "All Category 3") to assist in illustrating the data to a reviewer in a concise way. Grouped row 550 represents all data across the sub-categories of Category 3 in one cell so the reviewer or downstream processing can glean information regarding the individual data entries quickly, significantly reducing processing or review time associated with analysis of each sub-category of Category 3 individually. Moreover, the flags provided can be associated with various performance metrics to analyze the database table 500 provided.

In an example, sub-categories are related to values on different days (e.g., a category of prescription frequency can have a sub-category for each day of the week to provide information regarding the prescriptions and dosages on a given day). In another example, sub-categories are related to values from different events (e.g., a category of diagnosis can have a sub-category for each diagnosis that was provided). In an example, a "yes" flag will be provided if the individual data entries within a group have the same value for a certain category. In the same way, a "no" flag will be provided if the individual data entries within a group do not have the same value for a certain category. The addition of the flags to the group view shown in FIG. 5B allows for efficient review of the data and provides more insight into the individual data entries included in the group.

One or more implementations disclosed herein include and/or are implemented using a machine learning model. For example, one or more of the modules of the analysis platform 111 are implemented using a machine learning model and/or are used to train the machine learning model. A given machine learning model is trained using the training flowchart 600 of FIG. 6. Training data 612 includes one or more of stage inputs 614 and known outcomes 618 related to the machine learning model to be trained. Stage inputs 614 are from any applicable source including text, visual representations, data, values, comparisons, and stage outputs, e.g., one or more outputs from one or more steps from FIG. 2. The known outcomes 618 are included for the machine learning models generated based on supervised or semi-supervised training. An unsupervised machine learning model is not be trained using known outcomes 618. Known outcomes 618 includes known or desired outputs for future inputs similar to or in the same category as stage inputs 614 that do not have corresponding known outputs.

The training data 612 and a training algorithm 620, e.g., one or more of the modules implemented using the machine learning model and/or are used to train the machine learning model, is provided to a training component 630 that applies the training data 612 to the training algorithm 620 to generate the machine learning model. According to an implementation, the training component 630 is provided comparison results 616 that compare a previous output of the corresponding machine learning model to apply the previous result to re-train the machine learning model. The comparison results 616 are used by training component 630 to update the corresponding machine learning model. The training algorithm 620 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the processes illustrated in FIG. 2 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 7 illustrates an implementation of a computer system that executes techniques presented herein. The computer system 700 includes a set of instructions that are executed to cause the computer system 700 to perform any one or more of the methods or computer based functions disclosed herein. The computer system 700 operates as a standalone device or is connected, e.g., using a network, to other computer systems or peripheral devices. In an example, the method described in the flowchart of FIG. 2 is implemented by the computer of FIG. 7.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 700 operates in the capacity of a server or as a client user computer in a server-client user network environment, or as a peer computer system in a peer-to-peer (or distributed) network environment. The computer system 700 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 is implemented using electronic devices that provide voice, video, or data communication. Further, while the computer system 700 is illustrated as a single system, the term "system" shall also be taken to include any collection of systems or sub-systems that individually or jointly execute a set, or multiple sets, of instructions to perform one or more computer functions.

As illustrated in FIG. 7, the computer system 700 includes a processor 702, e.g., a central processing unit (CPU), a graphics processing unit (GPU), or both. The processor 702 is a component in a variety of systems. For example, the processor 702 is part of a standard personal computer or a workstation. The processor 702 is one or more processors, digital signal processors, application specific integrated circuits, field programmable gate arrays, servers, networks, digital circuits, analog circuits, combinations thereof, or other now known or later developed devices for analyzing and processing data. The processor 702 implements a software program, such as code generated manually (i.e., programmed).

The computer system 700 includes a memory 704 that communicates via bus 708. Memory 704 is a main memory, a static memory, or a dynamic memory. Memory 704 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. Memory 704 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts, or tasks illustrated in the figures or described herein are performed by processor 702 executing the instructions stored in memory 704. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 700 further includes a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 acts as an interface for the user to see the functioning of the processor 702, or specifically as an interface with the software stored in the memory 704 or in the drive unit 706.

Additionally or alternatively, the computer system 700 includes an input/output device 712 configured to allow a user to interact with any of the components of the computer system 700. The input/output device 712 is a number pad, a keyboard, a cursor control device, such as a mouse, a joystick, touch screen display, remote control, or any other device operative to interact with the computer system 700.

The computer system 700 also includes the drive unit 706 implemented as a disk or optical drive. The drive unit 706 includes a computer-readable medium 722 in which one or more sets of instructions 724, e.g. software, is embedded. Further, the sets of instructions 724 embodies one or more of the methods or logic as described herein. Instructions 724 resides completely or partially within memory 704 and/or within processor 702 during execution by the computer system 700. The memory 704 and the processor 702 also include computer-readable media as discussed above.

In some systems, computer-readable medium 722 includes the set of instructions 724 or receives and executes the set of instructions 724 responsive to a propagated signal so that a device connected to network 730 communicates voice, video, audio, images, or any other data over network 730. Further, the sets of instructions 724 are transmitted or received over the network 730 via the communication port or interface 720, and/or using the bus 708. The communication port or interface 720 is a part of the processor 702 or is a separate component. The communication port or interface 720 is created in software or is a physical connection in hardware. The communication port or interface 720 is configured to connect with the network 730, external media, display 710, or any other components in the computer system 700, or combinations thereof. The connection with network 730 is a physical connection, such as a wired Ethernet connection, or is established wirelessly as discussed below. Likewise, the additional connections with other components of the computer system 700 are physical connections or are established wirelessly. Network 730 alternatively be directly connected to the bus 708.

While the computer-readable medium 722 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 722 is non-transitory, and may be tangible.

The computer-readable medium 722 includes a solid-state memory such as a memory card or other package that houses one or more non-volatile read-only memories. The computer-readable medium 722 is a random-access memory or other volatile re-writable memory. Additionally or alternatively, the computer-readable medium 722 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 700 is connected to network 730. Network 730 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 730 includes wide area networks (WAN), such as the Internet, local area networks (LAN), campus area networks, metropolitan area networks, a direct connection such as through a Universal Serial Bus (USB) port, or any other networks that allows for data communication. Network 730 is configured to couple one computing device to another computing device to enable communication of data between the devices. Network 730 is generally enabled to employ any form of machine-readable media for communicating information from one device to another. Network 730 includes communication methods by which information travels between computing devices. Network 730 is divided into sub-networks. The sub-networks allow access to all of the other components connected thereto or the sub-networks restrict access between the components. Network 730 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the present disclosure, various features are sometimes grouped together in a single embodiment, figure, or description thereof for the purpose of streamlining the disclosure and aiding in the understanding of one or more of the various inventive aspects. This method of the present disclosure, however, is not to be interpreted as reflecting an intention that the claimed embodiments require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure are practiced without these specific details. In other instances, well-known methods, structures and techniques have not been shown in detail in order not to obscure an understanding of this description.

Thus, while there has been described what are believed to be the preferred embodiments of the present disclosure, those skilled in the art will recognize that other and further modifications are made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects:

Example 1: A computer-implemented method comprising: accessing, by one or more processors, one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, grouping, by one or more processors, the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively performing, by the one or more processors, the grouping across the one or more database tables to generate a plurality of grouped rows; incrementing, by the one or more processors, a counter value to reflect a total number of the plurality of grouped rows; and generating, by the one or more processors, a performance metric based on the counter value.

Example 2: The method of example 1, further comprising: determining, by the one or more processors, whether the one or more first data values are common to the first row and to the second row; and determining, by the one or more processors, whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

Example 3: The method of example 2, further comprising: causing, by the one or more processors, display of a graphical element based on the first data format, the graphical element corresponding to the data field and indicating that the one or more first data values are common to the first row and to the second row and that the one or more second data values are common to the first row and to the second row.

Example 4: The method of any of examples 1-3, further comprising: determining, by the one or more processors, whether the one or more first data values are common to the first row and to the second row; and determining, by the one or more processors, whether the one or more second data values are common to the first row and to the second row, wherein, in response to determining that the one or more first data values are not common to the first row and to the second row and that the one or more second data values are not common to the first row and to the second row, the determined data format is a second data format that represents an absence of commonality.

Example 5: The method of example 4, further comprising: causing, by the one or more processors, display of a graphical element based on the second data format, the graphical element corresponding to the data field indicating that the one or more first data values are not common to the first row and to the second row and that the one or more second data values are not common to the first row and to the second row.

Example 6: The method of any of examples 1-5, wherein the data field is a binary flag value.

Example 7: The method of any of examples 1-6, further comprising: applying, by the one or more processors, a machine-learning model to content of the grouped row, the machine-learning model having been trained to identify data entries in the grouped row as a reference data entry or as a target data entry; and determining, by the one or more processors and based on the application of the machine-learning model to the grouped row, a prediction indicator indicating whether the target data entry is a confirmed target data entry or a rejected target data entry.

Example 8: The method of example 7, further comprising: determining, by the one or more processors and based on the application of the machine-learning model to the grouped row, a confidence level for each prediction indicator, the confidence level being indicative of a probability that the target data entry is a correctly identified confirmed target data entry.

Example 9: The method of example 8, the method further comprising: determining, by the one or more processors, based on the application of the machine-learning model to the plurality of grouped rows, a group score for each grouped row, the group score being indicative of a probability that the corresponding grouped row includes at least one confirmed data entry by aggregating the confidence level for each target data entry within the corresponding grouped row.

Example 10: A system comprising: one or more processors of a computing system; and at least one non-transitory computer readable medium storing instructions which, when executed by the one or more processors, cause the one or more processors to: access one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, group the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively perform the grouping across the one or more database tables to generate a plurality of grouped rows; increment a counter value to reflect a total number of the plurality of grouped rows; and generate a performance metric based on the counter value.

Example 11: The system of example 10, wherein the instructions, when executed by the one or more processors, cause the one or more processors to: determine whether the one or more first data values are common to the first row and to the second row; and determine whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

Example 12: The system of example 11, wherein the instructions, when executed by the one or more processors, further cause the one or more processors to: cause display of a graphical element based on the first data format, the graphical element corresponding to the data field and indicating that the one or more first data values are common to the first row and to the second row and that the one or more second data values are common to the first row and to the second row.

Example 13: The system of any of examples 10-12, wherein the instructions, when executed by the one or more processors, further cause the one or more processors to: determine whether the one or more first data values are common to the first row and to the second row; and determine whether the one or more second data values are common to the first row and to the second row, wherein, in response to determining that the one or more first data values are not common to the first row and to the second row and that the one or more second data values are not common to the first row and to the second row, the determined data format is a second data format that represents an absence of commonality.

Example 14: The system of example 13, wherein the instructions, when executed by the one or more processors, further cause the one or more processors to: cause display of a graphical element based on the second data format, the graphical element corresponding to the data field indicating that the one or more first data values are not common to the first row and to the second row and that the one or more second data values are not common to the first row and to the second row.

Example 15: The system of any of examples 10-14, wherein the data field is a binary flag value.

Example 16: The system of any of examples 10-15, wherein the instructions, when executed by the one or more processors, further cause the one or more processors to: apply a machine-learning model to content of the grouped row, the machine-learning model having been trained to identify data entries in the grouped row as a reference data entry or as a target data; and determine, based on the application of the machine-learning model to the grouped row, a prediction indicator indicating whether the target data entry is a confirmed target data entry or a rejected target data entry.

Example 17: The system of example 16, wherein the instructions, when executed by the one or more processors, further cause the one or more processors to: determine, based on the application of the machine-learning model to the grouped row, a confidence level for each prediction indicator, the confidence level being indicative of a probability that the target data entry is a correctly identified confirmed target data entry.

Example 18: The system of example 17, wherein the instructions, when executed by the one or more processors, further cause the one or more processors to: determine, based on the application of the machine-learning model to the plurality of grouped rows, a group score for each grouped row, the group score being indicative of a probability that the corresponding grouped row includes at least one confirmed data entry by aggregating the confidence level for each target data entry within the corresponding grouped row.

Example 19: A non-transitory computer readable medium, the non-transitory computer readable medium storing instructions which, when executed by one or more processors of a computing system, cause the one or more processors to: access one or more database tables that include (1) a first row storing a first set of data that includes one or more first selection criteria values and one or more first data values, and (2) a second row storing a second set of data that includes the one or more first selection criteria values and one or more second data values, wherein the first set of data and the second set of data are ungrouped; in response to determining that the first set of data and the second set of data share the one or more first selection criteria values, group the first row and the second row to generate a grouped row, wherein the grouped row indicates (1) the one or more first data values and the one or more second data values in a data format that is determined based on a comparison of the one or more first data values and the one or more second data values, and (2) a data field that includes an indication of the comparison; iteratively perform the grouping across the one or more database tables to generate a plurality of grouped rows; increment a counter value to reflect a total number of the plurality of grouped rows; and generate a performance metric based on the counter value.

Example 20: The non-transitory computer readable medium of example 19, wherein the instructions, when executed by the one or more processors, further cause the one or more processors to: determine whether the one or more first data values are common to the first row and to the second row; and determine whether the one or more second data values are common to the first row and to the second row, wherein, in response to determining that the one or more first data values are common to the first row and to the second row and that the one or more second data values are common to the first row and to the second row, the determined data format is a first data format that represents the determined commonalities.

What is claimed is:

1. A computer-implemented method comprising:
   accessing, by one or more processors, one or more database tables that include (1) a first row storing a first set of data that includes one or more first selection criteria values and one or more first data values of one or more data types, and (2) a second row storing a second set of data that includes the one or more first selection criteria values and one or more second data values of the one or more data types, wherein the first set of data and the second set of data are ungrouped;
   determining, by the one or more processors, that the first set of data and the second set of data share the one or more first selection criteria values;
   comparing, by the one or more processors, the one or more first data values included in the first set of data and the one or more second data values included in the second set of data;
   in response to the determination and based on the comparison, grouping, by the one or more processors, the first row and the second row to generate a grouped row, wherein the grouped row comprises a data field for each respective data type of the one or more data types, and the data field for the respective data type includes a first data value, from the one or more first data values, for the respective data type and a second data value, from the one or more second data values, for the respective data type grouped in a data format representing a presence or absence of commonality between the first data value and the second data value determined based on the comparison;
   generating, and included in the grouped row, a new data field that includes an indication of a result of the comparison of the first data value and the second data value included in the data field for at least one data type of the one or more data types;
   iteratively performing, by the one or more processors, the grouping across the one or more database tables to generate a plurality of grouped rows;
   incrementing, by the one or more processors, a counter value to reflect a total number of the plurality of grouped rows; and
   generating, by the one or more processors, a performance metric based on the counter value.

2. The method of claim 1, wherein the comparing, by the one or more processors, comprises:
   determining, by the one or more processors, whether the one or more first data values are common to the first row and to the second row;
   determining, by the one or more processors, whether the one or more second data values are common to the first row and to the second row; and
   in response to determining that the one or more first data values are common to the first row and to the second row and the one or more second data values are common to the first row and to the second row, determining that the data format is a first data format representing a presence of commonality.

3. The method of claim 2, further comprising:
   causing, by the one or more processors, display of a graphical element based on the first data format, the graphical element corresponding to the new data field and indicating the one or more first data values are common to the first row and to the second row and the one or more second data values are common to the first row and to the second row.

4. The method of claim 1, wherein the comparing, by the one or more processors, comprises:
   determining, by the one or more processors, whether the one or more first data values are common to the first row and to the second row;
   determining, by the one or more processors, whether the one or more second data values are common to the first row and to the second row; and
   in response to determining that the one or more first data values are not common to the first row and to the second row and the one or more second data values are not common to the first row and to the second row, determining the data format is a second data format representing an absence of commonality.

5. The method of claim 4, further comprising:
   causing, by the one or more processors, display of a graphical element based on the second data format, the graphical element corresponding to the new data field indicating the one or more first data values are not common to the first row and to the second row and the one or more second data values are not common to the first row and to the second row.

6. The method of claim 1, wherein the indication of the result of the comparison included in the new data field is a binary flag value.

7. The method of claim 1, further comprising:
   applying, by the one or more processors, a machine-learning model to content of the grouped row, the machine-learning model having been trained to identify each data entry in a plurality of data entries in the grouped row as a reference data entry or as a target data entry, and
   determining, by the one or more processors and based on the application of the machine-learning model to the grouped row, a plurality of prediction indicators, each prediction indicator indicating whether the target data entry is a confirmed target data entry or a rejected target data entry.

8. The method of claim 7, further comprising:
   determining, by the one or more processors and based on the application of the machine-learning model to the grouped row, a confidence level for each prediction indicator in the plurality of prediction indicators, the confidence level being indicative of a probability the target data entry is a correctly identified confirmed target data entry.

9. The method of claim 1, the method further comprising:
   applying, by the one or more processors, a machine-learning model to content of each corresponding grouped row in the plurality of grouped rows, the machine-learning model having been trained to identify each data entry in a plurality of data entries in the corresponding grouped row as a reference data entry or as a target data entry;
   determining, by the one or more processors and based on the application of the machine-learning model to each corresponding grouped row in the plurality of grouped rows, a plurality of prediction indicators, each prediction indicator indicating whether the target data entry is a confirmed target data entry or a rejected target data entry:
   determining, by the one or more processors and based on the application of the machine-learning model to each corresponding grouped row in the plurality of grouped rows, a plurality of confidence levels for the plurality of prediction indicators, each confidence level in the plurality of confidence levels being indicative of a probability the target data entry is a correctly identified confirmed target data entry; and determining, by the one or more processors, based on the application of the machine-learning model to each corresponding grouped now in the plurality of grouped rows, a group score for the corresponding grouped row, the group score being indicative of a probability the corresponding grouped row includes at least one confirmed data entry by aggregating plurality of the confidence levels for the corresponding grouped row.

10. The method of claim 1, wherein one of the first row or the second row grouped to generate the grouped row represents a target data entry associated with a potential data anomaly and the other of the first row or the second row represents a reference data entry for the target data entry, and the method further comprises:

for each of the plurality of grouped rows, identifying the one of the first row or the second row representing the target data entry, and determining whether the target data entry includes the potential data anomaly based on the other of the first row or the second row representing the reference data entry.

11. A system comprising:
one or more processors; and
one or more non-transitory computer readable media storing processor-executable instructions that, when executed by the one or more processors, cause the one or more processors to perform operations comprising:
accessing one or more database tables that include (1) a first row storing a first set of data that includes one or more first selection criteria values and one or more first data values of one or more data types, and (2) a second row storing a second set of data that includes the one or more first selection criteria values and one or more second data values of the one or more data types, wherein the first set of data and the second set of data are ungrouped;
determining that the first set of data and the second set of data share the one or more first selection criteria values;
comparing the one or more first data values included in the first set of data and the one or more second data values included in the second set of data;
in response to the determination and based on the comparison, grouping the first row and the second row to generate a grouped row, wherein the grouped row comprises a data field for each respective data type of the one or more data types, and the data field for the respective data type includes a first data value, from the one or more first data values, for the respective data type and a second data value, from the one or more second data values, for the respective data type grouped in a data format representing a presence or absence of commonality between the first data value and the second data value determined based on the comparison;
generating, and included in the grouped row, a new data field that includes an indication of a result of the comparison of the first data value and the second data value included in the data field for at least one data type of the one or more data types;
iteratively performing the grouping across the one or more database tables to generate a plurality of grouped rows;

incrementing a counter value to reflect a total number of the plurality of grouped rows; and
generating a performance metric based on the counter value.

12. The system of claim 11, wherein the comparing comprises:
determining whether the one or more first data values are common to the first row and to the second row;
determining whether the one or more second data values are common to the first row and to the second row; and
in response to determining that the one or more first data values are common to the first row and to the second row and the one or more second data values are common to the first row and to the second row, determining that the data format is a first data format representing a presence of commonality.

13. The system of claim 12, wherein the operations further comprise:
causing display of a graphical element based on the first data format, the graphical element corresponding to the new data field and indicating the one or more first data values are common to the first row and to the second row and the one or more second data values are common to the first row and to the second row.

14. The system of claim 11, wherein the comparing comprises:
determining whether the one or more first data values are common to the first row and to the second row;
determining whether the one or more second data values are common to the first row and to the second row; and
in response to determining that the one or more first data values are not common to the first row and to the second row and the one or more second data values are not common to the first row and to the second row, determining that the data format is a second data format representing an absence of commonality.

15. The system of claim 14, wherein the operations further comprise:
causing display of a graphical element based on the second data format, the graphical element corresponding to the new data field indicating the one or more first data values are not common to the first row and to the second row and the one or more second data values are not common to the first row and to the second row.

16. The system of claim 11, wherein the indication of the result of the comparison included in the new data field is a binary flag value.

17. The system of claim 11, wherein the operations further comprise:
applying a machine-learning model to content of the grouped row, the machine-learning model having been trained to identify each data entry in a plurality of data entries in the grouped row as a reference data entry or as a target data entry; and
determining, based on the application of the machine-learning model to the grouped row, a plurality of prediction indicators, each prediction indicator indicating whether the target data entry is a confirmed target data entry or a rejected target data entry.

18. The system of claim 11, wherein the operations further comprise:
applying a machine-learning model to content of each corresponding grouped row in the plurality of grouped rows, the machine-learning model having been trained to identify each data entry in a plurality of data entries in the corresponding grouped row as a reference data entry or as a target data entry;

determining, based on the application of the machine-learning model to each corresponding grouped row in the plurality of grouped rows, a plurality of prediction indicators, each prediction indicator indicating whether the target data entry is a confirmed target data entry or a rejected target data entry;

determining, based on the application of the machine-learning model to each corresponding grouped row in the plurality of grouped rows, a pluralit of confidence levels for the plurality of prediction indicators, each confidence level in the plurality of confidence levels being indicative of a probability the target data entry is a correctly identified confirmed target data entry; and determining, based on the application of the machine-learning model to each corresponding groued row in the plurality of grouped rows, a group score for the corresponding grouped row, the group score being indicative of a probability the corresponding grouped row includes at least one confirmed data entry by aggregating the plurality of confidence levels for the corresponding grouped row.

19. One or more non-transitory computer readable media storing instructions that, when executed by one or more processors of a computing system, cause the one or more processors to perform operations comprising:

accessing one or more database tables that include (1) a first row storing a first set of data that includes one or more first selection criteria values and one or more first data values of one or more data types, and (2) a second row storing a second set of data that includes the one or more first selection criteria values and one or more second data values of the one or more data types, wherein the first set of data and the second set of data are ungrouped;

determining that the first set of data and the second set of data share the one or more first selection criteria values;

comparing the one or more first data values included in the first set of data and the one or more second data values included in the second set of data;

in response to the determination and based on the comparison, grouping the first row and the second row to generate a grouped row, wherein the grouped row comprises a data field for each respective data type of the one or more data types, and the data field for the respective data type includes a first data value, from the one or more first data values, for the respective data type and a second data value, from the one or more second data values, for the respective data type grouped in a data format representing a presence or absence of commonality between the first data value and the second data value determined based on the comparison;

generating, and included in the grouped row, a new data field that includes an indication of a result of the comparison of the first data value and the second data value included in the data field for at least one data type of the one or more data types;

iteratively performing the grouping across the one or more database tables to generate a plurality of grouped rows;

incrementing a counter value to reflect a total number of the plurality of grouped rows; and generating a performance metric based on the counter value.

20. The one or more non-transitory computer readable media of claim 19, wherein the comparing includes:

determining whether the one or more first data values are common to the first row and to the second row;

determining whether the one or more second data values are common to the first row and to the second row;

in response to determining that the one or more first data values are common to the first row and to the second row and the one or more second data values are common to the first row and to the second row, determining that the data format is a first data format representing a presence of commonality; and in response to determining that the one or more first data values are not common to the first row and to the second row and the one or more second data values are not common to the first row and to the second row, determining that data format is a second data format, different from the first data format, representing an absence of commonality.

\* \* \* \* \*